`United States Patent` [19]

Hergenrother et al.

[11] Patent Number: 6,009,923

[45] Date of Patent: Jan. 4, 2000

[54] PNEUMATIC TIRE WITH AIR RETENTION INNERLINER PLY

[75] Inventors: William L. Hergenrother, Akron; Joseph K. Valaitis, Brecksville, both of Ohio

[73] Assignee: Bridgestone Corporation, Tokyo, Japan

[21] Appl. No.: 08/988,923

[22] Filed: Dec. 11, 1997

[51] Int. Cl.⁷ .................................................... B60C 5/14
[52] U.S. Cl. ............................................ 152/510; 525/71
[58] Field of Search ..................... 152/510, 511; 428/36.8, 36.6, 97; 525/71, 78, 80, 262, 193, 195; 524/505, 551, 561; 526/348.7, 923, 337

[56] References Cited

U.S. PATENT DOCUMENTS

| | | |
|---|---|---|
| 2,929,429 | 3/1960 | Russell et al. ........................ 152/510 |
| 3,586,087 | 6/1971 | Messerly et al. . |
| 3,712,360 | 1/1973 | Torti et al. . |
| 3,838,108 | 9/1974 | Hergenrother et al. . |
| 3,845,163 | 10/1974 | Murch . |
| 3,869,418 | 3/1975 | Peterson et al. . |
| 4,117,036 | 9/1978 | Honda et al. . |
| 4,174,358 | 11/1979 | Epstein . |
| 4,616,686 | 10/1986 | Berta . |
| 4,725,649 | 2/1988 | Hoshino . |
| 4,987,192 | 1/1991 | Oberster et al. ........................ 525/274 |
| 5,093,418 | 3/1992 | Kinoshita et al. . |
| 5,093,426 | 3/1992 | Sakabe et al. . |
| 5,122,569 | 6/1992 | Scheibelhoffer et al. . |
| 5,342,896 | 8/1994 | Jalics et al. ............................. 525/193 |
| 5,464,899 | 11/1995 | Freeman et al. . |
| 5,484,005 | 1/1996 | Morehart et al. . |
| 5,494,091 | 2/1996 | Freeman et al. . |
| 5,494,958 | 2/1996 | Freeman et al. . |
| 5,776,294 | 7/1998 | Nagel .................................. 156/307.7 |

FOREIGN PATENT DOCUMENTS

| | | |
|---|---|---|
| 2051270 | 3/1992 | Canada . |
| 0475733 | 3/1992 | European Pat. Off. . |
| 3924531 | 2/1991 | Germany . |

*Primary Examiner*—Geoffrey L. Knable
*Attorney, Agent, or Firm*—Frank J. Troy, Sr.; Aaron B. Retzer; John H. Hornickel

[57] ABSTRACT

A tubeless pneumatic vehicle tire having an interliner ply having reduced resistance to air permeability. The interliner rubber composition is a a graft copolymer of a butyl rubber or a halogenated butyl rubber backbone having pendently grafted thereto a polymerized metal salt of an unsaturated carboxylic acid.

23 Claims, No Drawings

PNEUMATIC TIRE WITH AIR RETENTION INNERLINER PLY

FIELD OF THE INVENTION

The invention relates to a tubeless pneumatic vehicle tire having a graft copolymer interliner having reduced resistance to air permeability.

BACKGROUND OF THE INVENTION

This invention relates to tubeless pneumatic tires. More specifically, it relates to an innerliner (hereinafter innerliner, or liner, or liner ply) which is the inner-most layer of the tire structure for maintaining the internal air pressure in such a tire.

U.S. Pat. No. 5,484,005, to Morehart et al, assigned to the assignee of the present application, displays the use of graft copolymers of diene monomers and copolymers and metal salts of an unsaturated carboxylic acid to form rubber skins in pneumatic tires having resistance to air permeability. This patent does not recognize the ability of metal salts of the unsaturated carboxylic acid to be grafted onto non-diene type rubbers to increase resistance to air permeability.

In a typical pneumatic tire manufacturing operation several plies of reinforced rubber were laid up during the tire building step and these became permanently laminated during the molding and curing step. Rubber innerliners are utilized in tubeless pneumatic tires because of their high resistance to air permeability. The innerliner is not wrapped around the bead cores but extends from bead to bead covering only the inner periphery of the tire. This is consistent with its basic function which is to prevent permeability of air through other tire components such as body plies, sidewalls, etc. Conventional rubber innerliners are generally composed of highly saturated rubbers such as butyl rubber, halogenated butyl rubbers or blends of butyl rubbers with small amounts (e.g. 10% by weight or less) of natural rubber because butyl and halobutyl rubbers represent the best air barrier among elastomers. In order to give a satisfactory performance in air pressure retention, the thickness of a butyl rubber based innerliner in a good quality auto tire must be on the order of about 60 mils.

When a vehicle is running, all of the components in the tires are flexing at a high frequency. A certain amount of energy is consumed as a "loss" due to hysteresis, which is the major contributor to the rolling resistance of the tire and is indicated by the rise in the temperature of the material. A need exists in the tire industry for a reduction in the mass of any one or more components of the tire, without impairing the performance of the intended function of the component(s), that would reduce its share of the energy loss and result in an improvement of tire performance and fuel economy.

The rolling resistance of a tire can also be improved by increasing the air pressure in the tire. However, with the butyl or halobutyl rubber innerliner, the higher pressure can only be maintained by a thicker and heavier liner. The added weight of a thicker innerliner would offset the gain from the higher air pressure because it would increase the hysteresis loss. Therefore, the only meaningful way to achieve a higher tire pressure would be by improving the air barrier property of the innerliner. The present invention solves the above mentioned problems of the tire industry.

The use of such rubber innerliners in tubeless tires while beneficial in preventing air permeability presents a number of significant disadvantages because the use of a separate rubber innerliner adds approximately 1.5 pounds to the total weight of the tire.

Accordingly, it is desireable to reduce gas transmission through the innerliner used in tubeless tires thereby allowing thinner interliners to be used and reducing the total tire weight.

SUMMARY OF THE INVENTION

This invention is directed to an improved pneumatic tire innerliner material which will provide substantially improved air pressure retention qualities while reducing the weight of the tire significantly compared to presently used tire innerliner materials. The pneumatic tire of this invention contains an innerliner layer of a graft copolymer comprising a butyl rubber or a halobutyl rubber having pendently grafted thereto a polymerized metal salt of an unsaturated carboxylic acid, said innerliner having an air permeability of no more than 1.2 (grams)(mil)/(m$^2$)(day) at 66° C., being thermally stable to withstand the conditions required for the vulcanization of the rubber layer, and having adequate flexibility and extensibility to meet the requirements for the fabrication process and functional needs of the tire that it is to become a part of, which is adhered to the rubber layer of the tire, usually the first carcass ply, with which it is in contact.

DETAILED DESCRIPTION OF THE INVENTION

As indicated, the rubber composition of the invention that is used as a tire innerliner layer or ply is a graft copolymer of a butyl rubber or halobutyl rubber having pendently grafted thereto a polymerized metal salt of an unsaturated carboxylic acid. It was discovered that the use of such graft copolymers can serve as excellent innerliners for tubeless pneumatic tires or other applications where a thin rubbery material with high air/gas barrier property is required. The requirements of this structure is that the barrier material innerliner layer provides excellent resistance to permeation by air and other gases and be well bondable to other rubbers used in the carcass of the tire.

The inclusion of the innerliner layer according to this invention in a tire effects a significant improvement in the air retention characteristics as compared to a similar tire having a conventional innerliner. The air permeation resistance of the barrier layer in the innerliner of the instant invention is significantly improved over conventional rubber innerliner stocks. Thus, a 3 or 4 mil layer of a graft copolymer material in the liner of this invention can be equivalent to a 10 mil or thicker layer of unmodified butyl rubber.

The improved pneumatic tire innerliner material of the present invention provides substantially improved air pressure retention qualities while reducing the weight of the tire significantly compared to presently used tire innerliner materials. The pneumatic tire of this invention contains an innerliner layer of a graft copolymer comprising a butyl rubber or halobutyl rubber having pendently grafted thereto a polymerized metal salt of an unsaturated carboxylic acid, said innerliner having an Exxon air permeability at 66° C. of less than 2.0, preferably no more than 1.2 (grams)(mil)/(m)(day), and being thermally stable to withstand the conditions required for the vulcanization of the rubber layer.

Butyl rubber or halogenated butyl rubbers which may be employed in the graft copolymer of the rubber composition of the invention include any of those conventionally used in rubber innerliners for tires. The preferred butyl rubbers are halogenated butyl rubbers including chlorobutyl rubber and bromobutyl rubber. A particularly preferred bromobutyl rubber is sold under the designation XP 50, a brominated polyisobutylene-para-methylstyrene copolymer with 2.05% Br and a Mooney viscosity ($ML_4$@100° C.) of 32, available from Exxon Chemical Co. A preferred chlorobutyl rubber is a chlorinated copolymer of isobutylene and isoprene having a Mooney viscosity ($ML_4$@100° C.) of 51–60, unsaturation level of 1. 1–1.7 mole percent, and a chlorine content of from 1.1–1.3 percent by weight available from Enjay Chemical Co. under the designation Enjay Butyl HT 10–66. Butyl rubber polymers or copolymers for use in the backbone of the graft copolymer include chlorobutyl rubber, bromobutyl rubber, and butyl rubber. The preferred butyl rubber polymer for use as the backbone of the graft copolymer is bromobutyl rubber.

Metal salt-containing materials which are employed in the graft copolymer rubber composition as part of a graft copolymers are the metal salt of the unsaturated carboxylic acid. Unsaturated carboxylic acids which may be used to form the metal salt are alpha, beta-ethylenically unsaturated carboxylic acids having from 3 to 8 carbon atoms such as acrylic, methacrylic, cinnamic and crotonic acids of which acrylic and methacrylic acids are preferred. Suitable metal ions which may be used to form the metal salts include sodium, potassium, magnesium, calcium, zinc, barium, aluminum, tin, zirconium, lithium and cadmium of which zinc and magnesium are preferred. The metal ion is preferably introduced in the form of the salt of the carboxylic acid. A particularly preferred metal salt is zinc dimethacrylate.

The graft copolymer can be prepared by a relatively uncomplicated procedure. Thus, the graft copolymer can be prepared by first dissolving a butyl rubber polymer such as bromobutyl rubber in a solvent such as hexane, then adding a metal salt of an unsaturated carboxylic acid such as zinc dimethacrylate to the polymer solution, adding a free radical initiator such as azo-bis-isobutyronitrile (AIBN) to the polymer solution and then heating the reaction mixture at a temperature of from about 40° to about 150° C. for a time period of from about 0.1 to about 100 hours to produce the graft copolymer.

The graft copolymer employed in the rubber composition of the invention contains from about 15 to 60, preferably 35 to about 55 percent by weight of the zinc dimethacrylate (ZDMA) or other metal salt of an alpha, beta-ethylenically unsaturated carboxylic acids and from about 85 to 40, preferably 65 to 45 percent by weight of the butyl rubber polymer. A preferred rubber composition of the invention comprises 50 parts by weight of bromobutyl rubber and 50 parts by weight of zinc dimethacrylate to be grafted onto the bromobutyl rubber.

The innerliner layer material must be thermally stable to withstand the conditions required for the vulcanization (crosslinking) of the rubber. The innerliner layer material also must have adequate flexibility and extensibility to meet the requirements of the fabrication process and functional needs of the object, such as tires, of which it is to become a part. As long as the innerliner layer layer meets the above requirements, additives, such as as carbon black, fillers, plasticizers, antioxidants, curing agents, curing accelerators and the like. Rubber compositions containing the rubber additives may be prepared by compounding or mixing the rubbers and rubber additives using standard rubber mixing equipment and procedures. The rubber compositions may be vulcanized using conventional rubber vulcanization conditions.

The following examples are submitted for the purpose of further illustrating the nature of the present invention and should not be regarded as a limitation on the scope thereof.

Parts and percentages shown in the examples are by weight unless otherwise indicated.

EXAMPLES

In these examples, rubber compositions containing the zinc dimethacrylate (ZDMA) graft copolymers of the invention were prepared and evaluated for properties. For comparative purposes, a butyl rubber based innerliner compound was prepared to serve as a control and evaluated for the same properties.

In these examples a 50% poly zinc dimethacrylate (ZDMA) graft copolymer onto bromobutyl rubber (XP 50) was prepared by dissolving 644 grams of bromobutyl rubber in 6.38 lbs of hexane in a two gallon stirred reactor. Once a solution was obtained, 644 grams of ZMDA was dispersed in 500 ml of hexane by rotation on a ball mill for at least four hours and added to the rubber solution together with 3.75 ml of a 1:1:1 mixture of Triton surfactants (X- 15, X-45 and X-100) available from Rohm and Haas Company and 10 grams of zinc stearate. The reactor was the sealed under nitrogen and heated to 80° C. at which point 1.0 gram of azo-bis-isobutyronitrile (AIBN) initiator dissolved in 50 ml of toluene was added. The temperature of the reactor was increased to 115° C. over a period of 100 minutes to provide a controlled complete decomposition of all of the initiator. The suspension was cooled and 3.2 grams of Polyguard, a nonyl phenyl phosphite anti-oxidant available from Uniroyal, was added before the solvent was removed by drum drying. The recovered graft copolymer rubber displayed a $ML_4$ at 100° C. of 137.9.

In the following Examples 1 to 4 the above-identified recovered graft copolymer was compounded with varying amounts of dicumyl peroxide (Dicup) per hundred parts of graft copolymer rubber (PHR) and cured at 170° C. for 12 minutes as displayed in Table 1. Also displayed in Table 1 are the properties of the resultant rubber compounds including Exxon air permeability (Q) at 66° C. measured in units of (grams)(mil)/($m^2$)(day), Shore A hardness, tensile strength, percent elongation at break, maximum torque values measured on the Monsanto Rheometer at 170° C. The rubber compositions containing the graft copolymers had the following formulations and properties shown in Table 1:

TABLE 1

| Example No. | 1 | 2 | 3 | 4 |
| --- | --- | --- | --- | --- |
| Dicup 40C (phr) | 2 | 4 | 6 | 8 |
| "Q" (g) (mil)/($m^2$) (day) | 1.02 | 1.09 | 1.04 | 0.90 |
| Shore A @ 22° C. | 90 | 90 | 89 | 88 |
| Tensile psi @ 22° C. | 952 | 905 | 900 | 889 |
| % Elong @ Break | 62 | 54 | 50 | 50 |
| Monsanto Rheometer $M_H$ (max torque) | 53.51 | 55.21 | 53.86 | 52.16 |

As comparative examples 5 to 8, the same amount of bromobutyl rubber, in the absence of zinc dimethacrylate, was cured with the same amounts of Dicup 40C as in Examples 1 to 4, respectively. Comparative examples 5 to 8 displayed poor cure and maximum torque as determined by the Monsanto Rheometer values of 6.33, 6.04, 6.23 and 6.52, respectively. Comparative examples 9 to 12 additionally added 50 phr of ZDMA monomer in the cure of the respective compounds in comparative examples 5 to 8 and displayed only a slight increase in the maximum torque measured on the Monsanto R. to 7.29, 7.04, 6.65 and 6.40, respectively.

A typical halobutyl innerliner for a 13 inch tubeless tire would weigh about two pounds while an innerliner of the instant invention having the same amount of gas transmission would weigh only 0.8 pounds representing a 60% weight reduction.

We claim:

1. An innerliner ply for a tubeless pneumatic tire, said ply comprising a gas barrier film comprising a butyl rubber having pendently grafted thereto a metal salt of an unsaturated carboxylic acid, said butyl rubber optionally being halogenated.

2. The innerliner ply of claim 1 wherein said gas barrier film has an air permeability at 66° C. of less than 2.0 g·mil/m²·day.

3. The innerliner ply of claim 2 wherein said gas barrier film has an air permeability at 66° C. of less than 1.2 g·mil/m²·day.

4. The innerliner ply of claim 1 wherein said butyl rubber is halogenated.

5. The innerliner ply of claim 4 wherein said halogenated butyl rubber comprises at one of bromobutyl rubber or chlorobutyl rubber.

6. The innerliner ply of claim 1 wherein said metal salt of an unsaturated carboxylic acid comprises:
   a metal selected from sodium, potassium, magnesium, calcium, zinc, barium, aluminum, tin, zirconium, lithium, and cadmium, and
   a $C_3$–$C_8$ $\alpha,\beta$-ethylenically unsaturated carboxylic acid.

7. The innerliner ply of claim 1 wherein the unsaturated carboxylic acid of said metal salt of an unsaturated carboxylic acid is at least one of acrylic acid, methacrylic acid, cinnamic acid, and crotonic acid.

8. The innerliner ply of claim 1 wherein said metal salt of an unsaturated carboxylic acid comprises zinc dimethacrylate.

9. The innerliner ply of claim 8 wherein said butyl rubber comprises bromobutyl rubber.

10. The innerliner ply of claim 1 wherein said film comprises from about 15 to 60 weight percent of a metal salt of an $\alpha,\beta$-ethylenically unsaturated carboxylic acid and from about 40 to 85 weight percent of said butyl rubber.

11. The innerliner ply of claim 10 wherein said metal salt of an unsaturated carboxylic acid comprises zinc dimethacrylate and said butyl rubber comprises bromobutyl rubber.

12. The innerliner ply of claim 1 wherein said film comprises from about 35 to 55 weight percent of a zinc dimethacrylate and from about 45 to 65 weight percent of a halogenated butyl rubber.

13. The innerliner ply of claim 12 wherein said film comprises about 50 weight percent of said zinc dimethacrylate and about 50 weight percent of said halogenated butyl rubber.

14. A tubeless pneumatic tire comprising:
   a) a tread,
   b) one or more reinforcing belts,
   c) sidewalls,
   d) one or more body plies and beads, and
   e) an innerliner ply formed from a composition comprising a butyl rubber having pendently grafted thereto a metal salt of an unsaturated carboxylic acid, said butyl rubber optionally being halogenated.

15. The tire of claim 14 wherein said innerliner ply has an air permeability at 66° C. of less than 2.0 g·mil/m²·day.

16. The tire of claim 15 wherein said gas barrier film has an air permeability at 66° C. of less than 1.2 g·mil/m²-day.

17. The tire of claim 14 wherein said butyl rubber is halogenated.

18. The tire of claim 17 wherein said halogenated butyl rubber comprises one of bromobutyl rubber or chlorobutyl rubber.

19. The tire of claim 14 wherein said metal salt of an unsaturated carboxylic acid comprises:
   a metal selected from sodium, potassium, magnesium, calcium, zinc, barium, aluminum, tin, zirconium, lithium, and cadmium, and
   a $C_3$–$C_8$ $\alpha,\beta$-ethylenically unsaturated carboxylic acid.

20. The tire of claim 14 wherein the unsaturated carboxylic acid of said metal salt of an unsaturated carboxylic acid is at least one of acrylic acid, methacrylic acid, cinnamic acid, and crotonic acid.

21. The tire of claim 14 wherein said metal salt of an unsaturated carboxylic acid comprises zinc dimethacrylate.

22. The tire of claim 21 wherein said butyl rubber comprises bromobutyl rubber.

23. The tire of claim 14 wherein said composition comprises from about 15 to 60 weight percent of a metal salt of an $\alpha,\beta$-ethylenically unsaturated carboxylic acid and from about 40 to 85 weight percent of said butyl rubber.

* * * * *